(12) United States Patent
Cohen et al.

(10) Patent No.: US 8,407,247 B2
(45) Date of Patent: Mar. 26, 2013

(54) UNIVERSAL RESOURCE LOCATOR WATCHDOG

(75) Inventors: Nir Cohen, Rishon Lezion (IL); Yuval Lavi, Tel-Aviv (IL); Tal Hasson, Petach Tikva (IL); Adam Ben-Ezer, Zofit (IL); Guilad Regev, Givataim (IL); Eyal Hashai, Natanya (IL)

(73) Assignee: Kenshoo Ltd., Tel Aviv (IL)

( * ) Notice: Subject to any disclaimer, the term of this patent is extended or adjusted under 35 U.S.C. 154(b) by 137 days.

(21) Appl. No.: 13/032,075

(22) Filed: Feb. 22, 2011

(65) Prior Publication Data

US 2011/0208992 A1   Aug. 25, 2011

Related U.S. Application Data

(60) Provisional application No. 61/306,734, filed on Feb. 22, 2010.

(51) Int. Cl.
*G06F 17/30* (2006.01)
(52) U.S. Cl. ....................................................... 707/781
(58) Field of Classification Search .................. 707/2, 3, 707/104.1, 781; 709/228; 726/12
See application file for complete search history.

(56) References Cited

U.S. PATENT DOCUMENTS

| | | | |
|---|---|---|---|
| 5,706,507 A | 1/1998 | Schloss | |
| 6,381,220 B1 | 4/2002 | Kung et al. | |
| 6,438,592 B1 | 8/2002 | Killian | |
| 7,143,088 B2 | 11/2006 | Green et al. | |
| 7,594,011 B2 | 9/2009 | Chandra | |
| 7,698,421 B2 | 4/2010 | Bernard et al. | |
| 2004/0034701 A1 | 2/2004 | Kasper, II | |
| 2005/0177597 A1* | 8/2005 | Elmer | 707/104.1 |
| 2006/0282318 A1* | 12/2006 | Larson et al. | 705/14 |
| 2008/0288647 A1* | 11/2008 | Gbadegesin | 709/228 |
| 2009/0198538 A1* | 8/2009 | Gupta et al. | 705/7 |
| 2010/0082429 A1* | 4/2010 | Samdadiya et al. | 705/14.49 |
| 2010/0205665 A1* | 8/2010 | Komili et al. | 726/12 |

* cited by examiner

*Primary Examiner* — Etienne Leroux
(74) *Attorney, Agent, or Firm* — Daniel J. Swirsky; AlphaPatent Associates Ltd.

(57) ABSTRACT

A watchdog system for identifying failures in uniform resource locators (URLs) respective of advertized content. The system comprises a database containing at least campaign information, the at least campaign information containing at least a URL to be monitored by the watchdog system, the URL directs to advertized content; and a server connected to the database and operative to monitor the at least URL for identification of a failure in the URL providing the advertized content, and performing a corrective action for correcting the URL based on definitions in the at least campaign information.

21 Claims, 3 Drawing Sheets

| Date/Time | Severity | Code | URL | Check Type |
|---|---|---|---|---|
| 2010-01-23 12:40:55.516 | High | escaped absolute path not valid | http://... | frequent |
| 2010-01-23 12:42:04.126 | High | escaped absolute path not valid | http://... | frequent |
| 2010-01-23 12:36:20.655 | Medium | 4 Redirects found for keyword Men's Khaki Pants | http://... | frequent |
| 2010-01-23 12:40:55.516 | Medium | match for [nN]ot.*[fF]ound | http://... | frequent |
| 2010-01-23 12:36:29.124 | Debug | OK(200) | http://... | frequent |

FIGURE 3

UNIVERSAL RESOURCE LOCATOR WATCHDOG

CROSS-REFERENCE TO RELATED APPLICATIONS

This application claims the benefit of U.S. provisional application No. 61/306,734 filed on Feb. 22, 2010, the contents of which are herein incorporated by reference.

TECHNICAL FIELD

The invention generally relates to web based advertisement, and more specifically to identification of problems in URLs or web site malfunction used in the process of conversion of an advertisement into a sale.

BACKGROUND OF THE INVENTION

The ubiquity of availability to access information using the Internet and the worldwide web (WWW), within a short period of time, and by means of a variety of access devices, has naturally drawn the focus of advertisers. The advertiser wishes to quickly and cost effectively reach the target audience and once reached, enable effective conversion of the observer of an advertisement into a purchaser of goods or services. The advertisers therefore pay search engines, such as Google® or Yahoo!®, as well as content advertising services such as Double-Click, for the placement of their advertisement when the keyword is presented by a user for a search.

In order to reach a product, the advertiser on the web provides an advertisement that is linked to a universal resource locator (URL). The advertisements are reached, or displayed typically in response to entering the search keywords or page content. When the advertisement is clicked upon the viewer is transferred directly or indirectly to a landing page where a transaction may take place. In realty, many of the clicks are lost because of various problems. This is because web sites, and their respective URLs, continuously go through changes, updates, and upgrades, which are an error prone process, as well as simple human errors and system redirects. It may take hours to months until a problem surfaces and gets fixed.

It would be therefore advantageous to provide a solution that identifies problems in such URLs. It would be further advantageous if such a solution enables the user to overcome the problem in real time.

SUMMARY OF THE INVENTION

Certain embodiments of the invention include a watchdog system for identifying failures in uniform resource locators (URLs) respective of advertized content. The system comprises a database containing at least campaign information, the at least campaign information containing at least a URL to be monitored by the watchdog system, the URL directs to advertized content; and a server connected to the database and operative to monitor the at least URL for identification of a failure in the URL providing the advertized content, and performing a corrective action for correcting the URL based on definitions in the at least campaign information.

Certain embodiments of the invention also include watchdogging uniform resource locators (URLs) respective of advertized content in a campaign. The method comprises determining a set of URLs providing the advertized content in the campaign; for each URL in the set of URLs performing: monitoring the URL to identify a failure in the URL; checking an error type of the identified failure in the URL; and providing a corrective action for correcting the URL based on definitions in campaign information and the error type.

BRIEF DESCRIPTION OF THE DRAWINGS

Various embodiments are particularly pointed out and distinctly claimed in the claims at the conclusion of the specification. The foregoing and other objects, features, and advantages of the invention will be apparent from the following detailed description taken in conjunction with the accompanying drawings.

FIG. 3 is a reporting table provided by the watchdog operations.

DETAILED DESCRIPTION OF THE INVENTION

Figure 1:
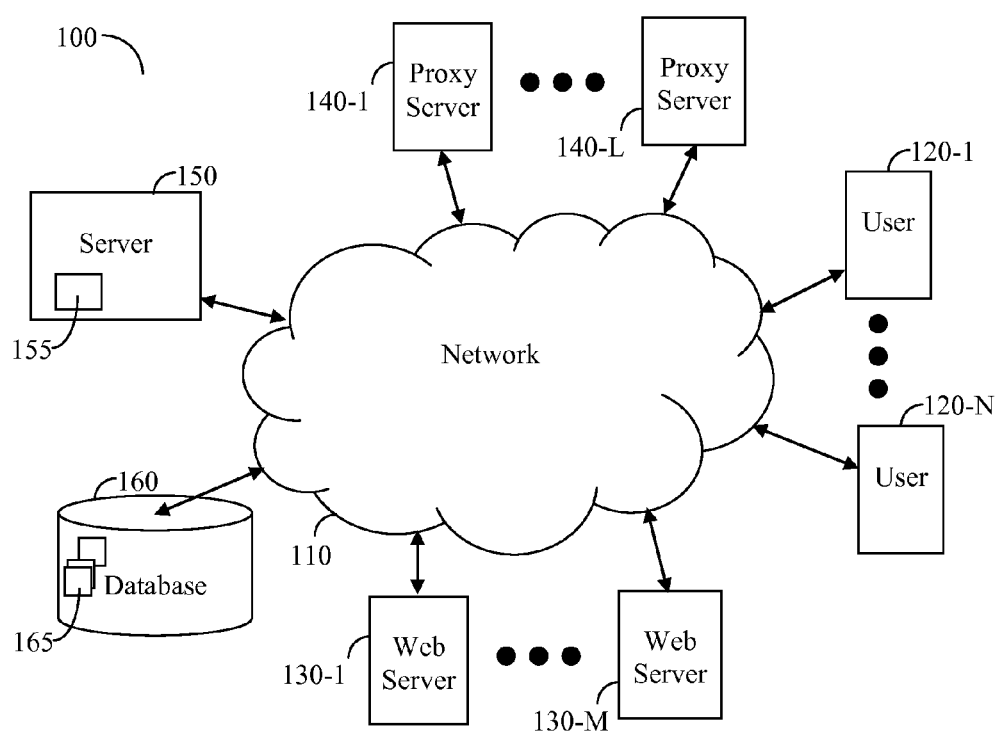
FIG. 1 is a schematic diagram of a system implemented in accordance with the principles of the invention.

The embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

The universal resource locator (URL) is on the critical path of any web based advertisement system. Loss of clicks, sales, brand quality or tracking data as well as landing on a wrong page all result in loss of revenue. The watchdog identifies failures respective to URLs and may act to address such failures. In one embodiment, the URLs' failures are fixed by providing alerts. In another embodiment, broken URLs are replaced with alternative URLs relating to landing pages with a better keyword correlation for the needs of the user being watched by the watchdog. Furthermore, a site or URL malfunction may be detected and an action to suspend, or otherwise pause or terminate a campaign may take place thereby preserving financial resources.

FIG. 1 depicts an exemplary and non-limiting system 100 implemented in accordance with the principles of the invention. A plurality of user nodes 120 are connected to a network 110. The user nodes 120 may be, but are not limited to, personal computers (PCs), personal digital assistants (PDAs), mobile phones, smartphones, tablet PCs, and so on. The network 110 includes, but not by way of limitation, a local area network (LAN), a wide area network (WAN), a metro area network (MAN), the Internet, the worldwide web (WWW), and other types of communication networks, as well as any combination thereof.

A web server 130 is connected to the network 110, the web server 130 being capable of responding to keywords, which further includes advertisements that may be displayed on a user node 120 screen including, but not limited to, display advertisements responsive to the content of a web page, and that are at least associated with a universal resource locator (URL) for the purpose of transferring the user directly or indirectly to a landing page for the display of a related advertisement and related actions, such as but not by way of limitation, purchase of products or services. In some cases, one or more proxy servers 140 are used to redirect the URL until arriving at the landing page on one of the plurality of web servers 130.

A proxy server 140 may be further used, in one embodiment, as a tracking server of an advertisement campaign. An advertiser handling a campaign stores the campaign parameters 165 in database 160, the database 160 coupled to the network 110. In one embodiment of the invention, a plurality of databases 160 may be used. Campaign parameters may include, but not by way of limitation, cost per click, keywords, URLs, and other relevant information.

A management server 150, also referred to herein as the server 150, is also connected to the network 110 and is further equipped with a watchdog module 155. In an embodiment, the module includes instructions embedded in tangible memory of the server 150, that when executed by the server 150, perform the function of a watchdog as further explained herein below in more detail. It should be further noted that campaign information may be used to prioritize URLs to be watched by the watchdog, to provide more appropriate URLs, and to make decisions on actions to be taken responsive thereof.

Figure 2:
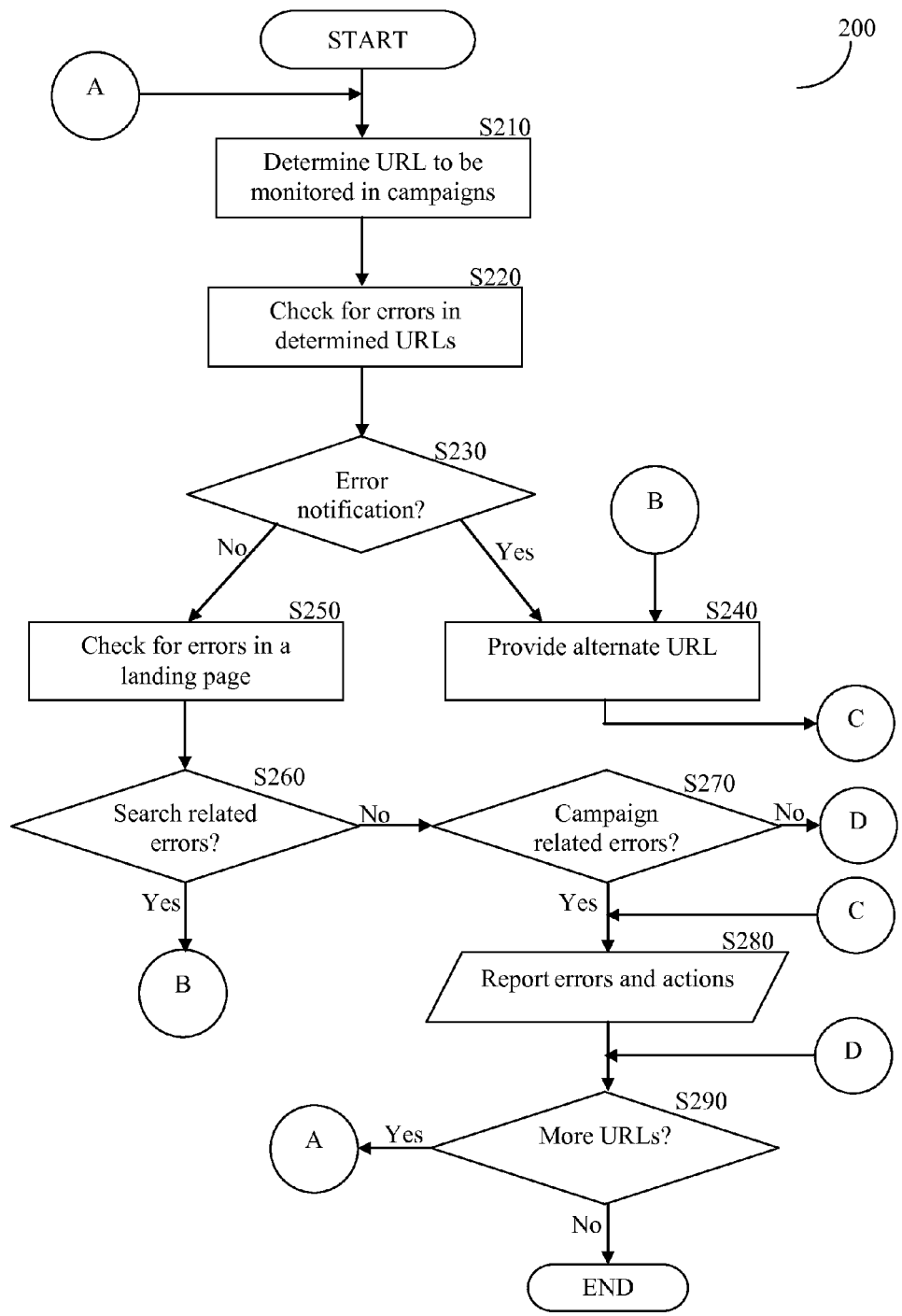
FIG. 2 is a flowchart for performing the watchdog operations in accordance with an embodiment of the invention.

FIG. 2 shows an exemplary and non-limiting flowchart 200 for performing the watchdog operations on, for example, system 100, and further in accordance with an embodiment of the invention. In S210, it is determined, based on the campaign content provided in the database 160 for each campaign 165, which URL is to be checked and at what frequency. The reason for this requirement is to balance the load on the relevant web server 130. It should be noted that it is not a good practice to perform the check at a percent higher than a threshold value which is a fraction of the full load of the web server 130 provided with its real traffic.

In S220, checks are made with respect to errors for those URLs determined to be within the current group of checked URLs. The checks can be made, for example and without limitation, by attempting to perform an access using those URLs. In S230 it is checked whether an error notification at the routing level was provided, e.g., an error code notification that the URL does not exist. An example for such an error code is HTML 404 error code. If so, continuing execution with S240; otherwise, continuing execution with S250. In S240, an alternate URL is provided. The alternate URL may be provided by the respective campaign 165 stored in the database 160, and subsequently execution continues with S280. Providing of an alternate URL can also be done by matching URLs harvested from the client web site by actively searching for campaign content imitating the behavior of a user surfing the internet. In another embodiment, the alternate URL is provided by the watchdog module 155 based on an alternate search for the same keywords that yield a proper response.

In S250, checks are made for errors with respect to the landing page. The checks can be made, for example and without limitation, by attempting to perform an access using those URLs and checking for error messages. Such errors may include, but are not limited to, an error message in a valid page, and hence to a page error, indicating that the product advertised is not available anymore as well as other error messages known to those of ordinary skill in the art. In S260, it is checked whether a landing page error is search related, and if so execution returns to S240, where an alternate URL is provided; otherwise, execution continues with S270. A search related error is an error relating to the search of an item that may no longer exist in an inventory or not offered anymore.

In S270, it is checked whether detected landing page errors are campaign related, and if so execution continues with S280; otherwise, execution continues with S290. A campaign error may be, without limitation, the case where too many redirect requests are used to reach at the landing page, thereby significantly reducing the user experience. In one embodiment of the invention, responsive to detection of a campaign error and/or report thereof, the watchdog module 155 pauses, or otherwise suspends the campaign. The reason for doing such an action is to prevent the case where despite the error, campaign funds are utilized even though the results are not per the expectations of the campaign. It provides the campaign manager with the opportunity to take corrective actions and overcome the reason for the one or more detected errors, and then resume the campaign.

In S280, a report is generated to inform a campaign manager of the errors detected by the watchdog module 155. An exemplary and non-limiting table is shown in FIG. 3 that contains the time when the error was detected, the severity of the error, the code respective of the error, the URL used (not shown in detail due to length of URLs but known to those of ordinary skill in the art), and the type of check performed. Other columns may be added and or subtracted from the report to tailor the report to the needs of the campaign and types of errors collected. In one embodiment of the invention, the report generated by the watchdog module 155 further provides information on of losses resulting from the errors over time, as well as prediction for future losses if such are not timely repaired. A report may be displayed on a screen of a campaign manager, provided as an e-mail alert, or by any other means of notification known to those of ordinary skill in the art.

In S290, it is checked whether additional URLs are to be checked, and if so execution continues with S210; otherwise, execution terminates. By design, the watchdog avoids impacting the tracking system, by operating transparently, attempting to reduce the load on the web sites as result of its operation. In one embodiment, the watchdog is enabled to suggest more suitable landing pages as well as to generate warnings for bad landing pages.

The watchdog module is therefore designed to identify broken URLs, invalid URLs, and URLs that cause landing on wrong landing pages. The watchdog module is further capable of minimizing failure time by providing real time alerts of failures. In one embodiment of the invention, the watchdog module is further enabled to provide land in domain verification as well as alerts thereof. Furthermore, with the campaign information 165 being configurable, the campaign manager, by updating the campaign information in the campaign information 165 can configure the test bench for the campaign. The watchdog module may be further enabled to monitor up/down statistics, DNS times, time-to-first-byte, transfer times, and various other information important to provide a better user experience. Furthermore, in one embodiment of the invention, the watchdog module may pause, suspend or terminate the campaign and allow for the correction of a detected error. This prevents unnecessary payment for useless clicks as far as the campaign is concerned but valid as far as a provider is concerned.

One of ordinary skill should appreciate that teachings discussed herein are not limited to search advertisements. Other usages of the principles of the invention would be apparent to those of ordinary skill in the art. Furthermore, it should be noted that the campaign information database is merely one source for URLs to be watched by the watchdog, however, it may be necessary to browse the internet or access one or more external databases to find the actual URL.

The principles of the invention are implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. All or some of the servers maybe combined into one or more integrated servers. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A watchdog system for identifying failures in uniform resource locators (URLs) respective of advertised content, the system comprising:
    a database configured to store a first URL associated with an advertising campaign having first advertising content and second advertising content, wherein the first URL is configured to direct an accessor of the first URL to the first advertising content; and
    a server configured to
        monitor the first URL thereby identifying a failure associated with the first URL to direct an accessor of the first URL to the first advertising content, and
        perform a corrective action to remedy the identified failure, wherein the corrective action results in an accessor of the first URL being directed to the second advertising content.

2. The watchdog system of claim 1, wherein the server is further configured to identify the failure by checking if a routing error notification is issued when trying to access the first URL.

3. The watchdog system of claim 2, wherein the routing error notification indicates that the first advertising content does not exist.

4. The watchdog system of claim 1, wherein the corrective action further comprises providing, instead of the first URL, an alternate URL directing the accessor to the second advertising content.

5. The watchdog system of claim 1, wherein the server is further configured to perform the corrective action by performing at least one of
    pausing,
    suspending, and
    terminating an action associated with the campaign.

6. The watchdog system of claim 1, wherein the server is further configured to identify the failure by identifying a landing page error.

7. The watchdog system of claim 6, wherein the landing page error includes any one of an error message in a valid page, a search related error, and a campaign related error.

8. The watchdog system of claim 7, wherein the campaign related error includes exceeding a predefined number of redirect requests.

9. The watchdog system of claim 1, wherein the server is further configured to generate alerts and reports on any of the failure and the corrective action.

10. The watchdog system of claim 1, wherein the server is further configured to monitor the first URL by monitoring up and down statistics, DNS times, time-to-first-byte, and transfer times.

11. A method for identifying failures in uniform resource locators (URLs) respective of advertised content, the method comprising:
    monitoring a first URL associated with an advertising campaign having first advertising content and second advertising content, wherein the first URL is configured to direct an accessor of the first URL to the first advertising content,
    thereby identifying a failure associated with the first URL to direct an accessor of the first URL to the first advertising content; and
    performing a corrective action to remedy the identified failure, wherein the corrective action results in an accessor of the first URL being directed to the second advertising content.

12. The method of claim 11, further comprising generating at least one of a report and an alert identifying any of the identified failure and the corrective action.

13. The method of claim 11, wherein the monitoring step comprises checking if a routing error notification is issued when trying to access the first URL.

14. The method of claim 11, wherein performing the corrective action comprises providing, instead of the first URL, an alternative URL directing the accessor to the second advertising content.

15. The method of claim 11, wherein the monitoring step comprises identifying the failure as a landing page error.

16. The method of claim 15, wherein the landing page error includes any one of an error message in a valid page, a search related error, and a campaign related error.

17. The method claim of 16, wherein performing the corrective action for the error message in a valid page and the search related error includes providing, instead of the first URL, an alternate URL directing the accessor to the second advertising content.

18. The method of claim 16, wherein the campaign related error includes exceeding a predefined number of redirect requests.

19. The method of claim 11, wherein performing the corrective action further comprises performing at least one of pausing, suspending, and terminating an action associated with the campaign.

20. The method of claim 11, wherein monitoring the first URL further comprises monitoring up and down statistics, DNS times, time-to-first-byte, and transfer times.

21. A computer program product for identifying failures in uniform resource locators (URLs) respective of advertised content, the computer program product comprising:
    a non-transitory, computer-readable storage medium; and computer-readable program code embodied in the computer-readable storage medium, where the computer-readable program code is configured to monitor a first URL associated with an advertising campaign having first advertising content and second advertising content, wherein the first URL is configured to direct an accessor of the first URL to the first advertising content, thereby identifying a failure associated with the first URL to direct an accessor of the first URL to the first advertising content, and perform a corrective action to remedy the identified failure, wherein the corrective action results in an accessor of the first URL being directed to the second advertising content.

* * * * *